United States Patent [19]

Aronne

[11] Patent Number: 5,050,278
[45] Date of Patent: Sep. 24, 1991

[54] HARNESS STRAP LUG LOCK MECHANISM
[75] Inventor: Armand J. Aronne, Massapequa, N.Y.
[73] Assignee: Grumman Aerospace Corporation, Bethpage, N.Y.
[21] Appl. No.: 482,886
[22] Filed: Feb. 22, 1990
[51] Int. Cl.⁵ .............................................. A44B 11/25
[52] U.S. Cl. ...................................................... 24/653
[58] Field of Search .................. 297/468; 24/653, 642, 24/639, 633

[56]  References Cited
U.S. PATENT DOCUMENTS

| 435,360 | 8/1890 | Kaylor | 24/642 X |
| 1,223,574 | 4/1917 | Fedczyszyn | 24/633 |
| 3,230,594 | 1/1966 | Smith | 24/653 |
| 3,593,388 | 7/1971 | Coyle | 24/653 |
| 4,206,533 | 6/1980 | Meiller et al. | 24/653 |

FOREIGN PATENT DOCUMENTS 7506 2/1913 United Kingdom .................. 24/642

Primary Examiner—James R. Brittain
Attorney, Agent, or Firm—Pollock, VandeSande & Priddy

[57]  ABSTRACT

A lock pin mechanism for a negative "G" pilot's harness includes a contoured strap lug received within a metal keeper. A lock pin passes through the keeper and engages the lug. A bearing surface exists between the lug and the keeper so that high upward forces exerted on a negative "G" strap are transmitted to the strap lug but become shared between a lug-pin interface as well as a lug-keeper interface. Thus, binding frictional engagement between pin and lug is avoided so that safe and secure withdrawal of the pin is achieved when required.

1 Claim, 1 Drawing Sheet

HARNESS STRAP LUG LOCK MECHANISM

FIELD OF THE INVENTION

The present invention relates to pilot harness fittings, and more particularly to a negative "G" strap lug mechanism for such a harness.

RELATED APPLICATIONS

The present application relates to co-pending U.S. application Ser. No. 482,755, application Ser. No. 534,949, and application Ser. No. 567,756, all in the name of the same inventor and assigned to the same assignee.

BACKGROUND OF THE INVENTION

Pilot harnesses for high speed military aircraft include strap sections which restrain vertical movement of a pilot in a cockpit thereby minimizing the likelihood of injury to the pilot's head and spine as a result of forceful contact with a cockpit canopy. Such a negative "G" strap usually terminates in a lug which engages a lock pin. The latter pin is generally connected to a mechanism, within the seat of the pilot, which withdraws the pin after the pilot has bailed out and prior to separation of the seat from the pilot, in preparation of a parachute landing.

Prior art lug lock mechanisms have exhibited failures during mechanism withdrawal of the lug lock pin due to high radial forces exerted by the weight of the pilot on the lug, the latter being transmitted to the lock pin. As a result, the pin becomes frictionally engaged by the lug thereby preventing it from axially withdrawing from the lug. The result, of course, can be fatal due to late or ineffectual parachute deployment. Accordingly, a need exists for an extremely reliable and secure mechanism for ensuring separation of lug and lock pin when such separation becomes appropriate.

BRIEF DESCRIPTION OF THE PRESENT INVENTION

The present invention offers a lug normally positioned over a lock pin but with the addition of a lug keeper which has a bearing surface for sharing a load with the lock pin instead of having the entire load borne by the lock pin itself. As a result, when a high force is transmitted from the lug to the lock pin, the bearing surface assumes a substantial portion of the load thereby diminishing the frictional engagement between the lug and the lug lock pin. Thus, at an appropriate moment, when the pin is withdrawn by a mechanism, there is no binding therebetween and the negative "G" strap previously anchored to the seat of a pilot now becomes free thereby permitting normal and timely deployment of the pilot's parachute. By virtue of the present invention, a simple and reliable means is presented which normally maintains the pilot in secure position relative to his seat within a cockpit. However, when bailout and parachute deployment are necessary, the invention assures accurate and quick release of the pilot's negative "G" strap from the lock mechanism thus maximizing the chances of the pilot's safe landing.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
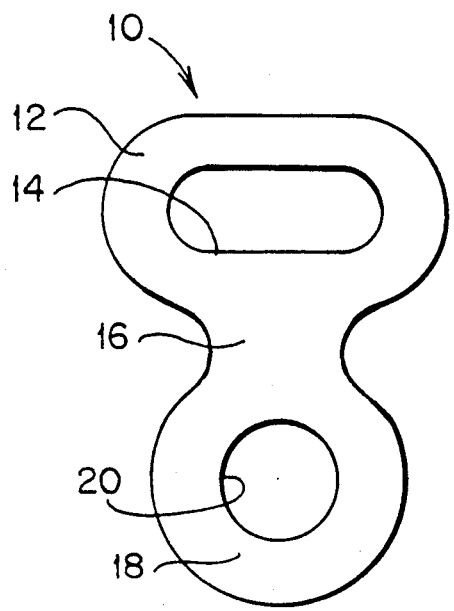
FIG. 1 is a plan view of a conventional negative "G" strap lug.
Figure 2:
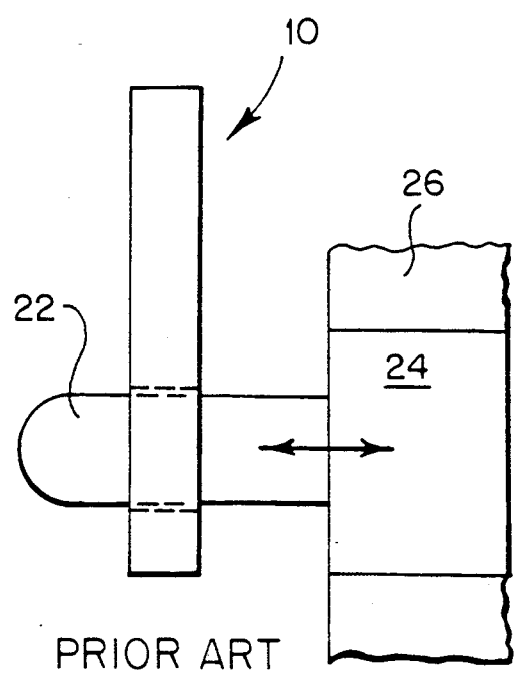
FIG. 2 is a side view illustrating the retention of such a lug on a lug lock pin.

Referring to FIG. 1, a conventional strap lug is illustrated by reference numeral 10. The lug includes an oblong end 12 having a similarly shaped opening 14 therein. In a preferred embodiment of the invention, the lug 10 is installed at the lower end of a negative "G" strap. The purpose of lug 10, as will be explained in greater detail herein, is to secure the negative "G" strap to the seat of the pilot during normal flight conditions so that his torso is restrained from excessive vertical displacement which might otherwise cause head and spine injury due to impact with a cockpit canopy. The body of lug 10 includes a central section 16 extending to an opposite end 18 having a circular opening 20 formed therein. The opening is received by a pin 22 (FIG. 2) during normal flight conditions. FIG. 2 further illustrates in diagrammatic form a mechanism 24 which draws pin 22 inwardly when separation of the negative "G" strap is required. As further shown in the figure, the mechanism 24 is received within the seat 26 of the pilot. The pin 22 is intended to extend perpendicularly outwardly from the front face of the mechanism 24 thereby permitting simple latching action between the lug 10 and the pin 22. In normal operation during flight, the pin is fully extended to receive lug 10. Due to the fact that a negative "G" strap (not shown) is normally tightened down to remain in tension, there is sufficient frictional engagement between the lug 10 and lock pin 22 to prevent separation therefrom. However, after ejection of the pilot, it is necessary to separate seat 26 from the pilot so as to permit full deployment of a parachute (not shown). When this becomes necessary, mechanism 24 retracts the pin 22 thereby causing separation of the negative "G" strap from the pin 22 and freeing the pilot from the seat. The mechanism 24 may be electromagnetic, pyrotechnic, or may involve a mechanical mechanism. However, the mechanism 24 is conventional and will therefore not be discussed in detail as part of the present description. As will be appreciated by viewing FIG. 2, a problem with the prior art exists when a relatively high tensile force is transmitted from a strap to the lug 10 at a time simultaneous with an attempted retraction of pin 22. Due to the load on lug 10, it is possible that sufficient frictional engagement exists between the lug and pin 22 to prevent retraction of the latter.

The improvement shown in FIG. 3 prevents the frictional binding between pin and lug as just described in connection with the prior art. A newly designed lock lug 28 is received within a metal keeper 30 and an inward end of the lug 28 partially encircles a lock pin 22. The keeper 30 assumes some of the load transmitted by pin 22 as will be presently explained. Thus, the improvement shown in FIG. 3 achieves a reduction in frictional engagement between pin 22 and lug 28 so as to avoid binding therebetween when a mechanism attempts to retract pin 22.

Figure 3:
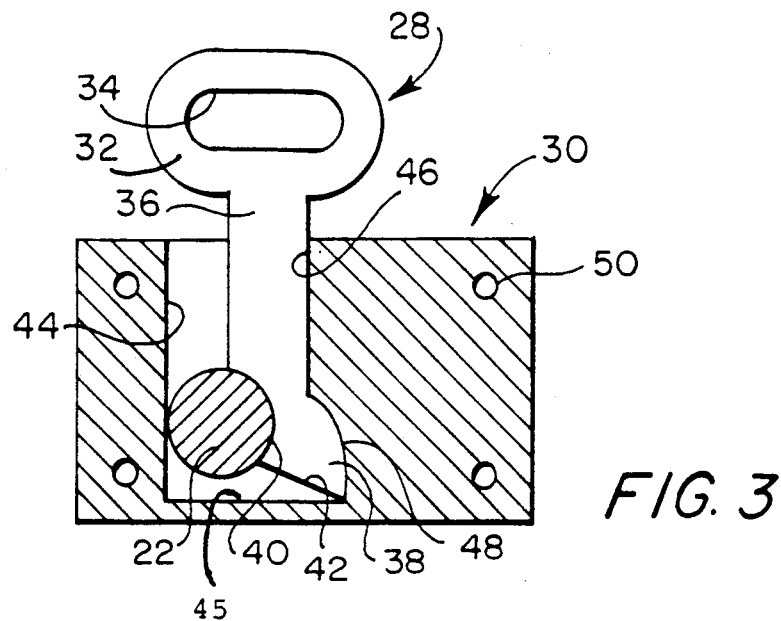
FIG. 3 is a partial sectional view illustrating the mechanism of the present invention.
Figure 4:
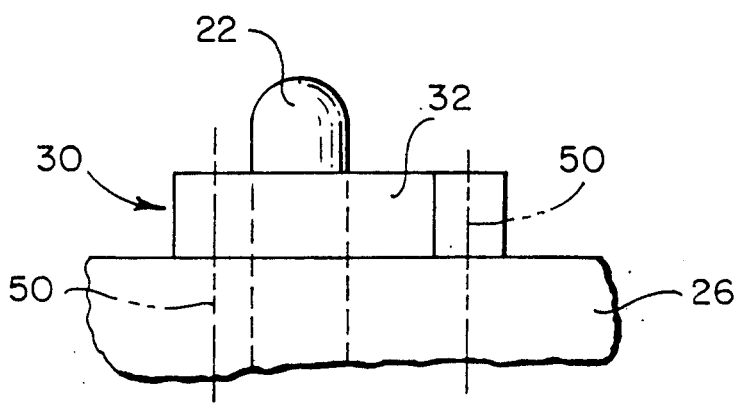
FIG. 4 is a top plan view illustrating the relationship between the present invention and the seat of a pilot.

Considering the structure of the present invention as shown in FIGS. 3 and 4, the lug is seen to include an upper end 32 of oblong shape having a similarly shaped opening 34 therein. The opening 34 serves to receive a negative "G" strap in the same manner as occurred with lug 10 of the prior art (FIGS. 1 and 2).

The central portion of lug 28 includes a straight section 36 terminating at an opposite end in an lug shoulder 38 incorporating an arcuate cut-out 40 which transversely receives pin 22. A lower outer end 42 of the lug 28 rests against the inner wall 45 of a recess 44 formed in keeper 30. Pin end 42 is generally cut along a radius of the cut out 40 so that the cut out exists for less than 180 degrees. A ledge 48 is formed within wall 46 of recess 44 so as to intimately contact the lug shoulder 38. By virtue of the pin-lug ledge contact, a high upward force exerted by the pilot on a negative "G" strap is transferred to pin 22; and from there the load is shared by the interface between pin 22 and lug 28 (at cut out 40) as well as at the interface between lug shoulder 38 and ledge 48. The end result will be a lessening of the frictional forces existing between pin 22 and lug 28. Accordingly, the pin 22 may be retracted quickly and reliably when this becomes necessary.

As illustrated in both FIGS. 3 and 4, the keeper 30 is fastened by suitable fasteners at 50 to the forward face of seat 26 so that lug 28 can be easily inserted within the keeper upon entry by a pilot into the cockpit.

Thus, the aforementioned description of the invention sets forth an improvement in a negative "G" lock pin mechanism which presents a pilot with a higher degree of safety than is present with prior art designs.

It should be understood that the invention is not limited to the exact details of construction shown and described herein for obvious modifications will occur to persons skilled in the art.

I claim:
1. A lock lug mechanism comprising:
a lug having a first end for receiving a strap;
an intermediate straight section extending from the first end;
an opposite lug end extending from the intermediate straight section and including
 a) an arcuate cut-out formed along a first straight section edge for receiving a pin which is retractable along a direction coincident with an axis of the pin, the axis also being coincident with the arcuate cut-out center, the cut-out embracing less than 180 degrees of the pin periphery, and
 b) a curved shoulder extending from a second straight section edge;
a lug keeper having an internal recess including
 c) a curved surface having the same curvature as the shoulder so as to snugly engage the shoulder in a locked condition, and
 d) a straight surface opposite the curved surface for tangentially contacting the pin when in the locked condition;
means for retracting the pin from contact with the straight surface and the cut-out;
whereby tension on the strap, when the pin is retracted, results in movement of the lug away from the curved keeper surface and subsequent displacement of the lug out from the keeper.

* * * * *